US011115444B2

(12) United States Patent
Katekar et al.

(10) Patent No.: US 11,115,444 B2
(45) Date of Patent: Sep. 7, 2021

(54) PRIVATE COMMUNICATIONS IN VIRTUAL MEETINGS

(71) Applicant: DOLBY LABORATORIES LICENSING CORPORATION, San Francisco, CA (US)

(72) Inventors: Rowan James Katekar, Redfern (AU); Glenn N. Dickins, Como (AU)

(73) Assignee: Dolby Laboratories Licensing Corporation, San Francisco, CA (US)

(*) Notice: Subject to any disclaimer, the term of this patent is extended or adjusted under 35 U.S.C. 154(b) by 112 days.

(21) Appl. No.: 15/672,009

(22) Filed: Aug. 8, 2017

(65) Prior Publication Data

US 2018/0048683 A1    Feb. 15, 2018

Related U.S. Application Data

(60) Provisional application No. 62/372,979, filed on Aug. 10, 2016.

(51) Int. Cl.
*H04L 29/06* (2006.01)
*H04L 12/18* (2006.01)

(52) U.S. Cl.
CPC ........ *H04L 65/403* (2013.01); *H04L 12/1822* (2013.01); *H04L 65/1006* (2013.01); *H04L 65/1093* (2013.01)

(58) Field of Classification Search
None
See application file for complete search history.

(56) References Cited

U.S. PATENT DOCUMENTS

| 6,404,873 | B1 | 6/2002 | Beyda |
| 6,839,417 | B2 | 1/2005 | Weisman |
| 7,003,286 | B2 | 2/2006 | Brown |
| 7,085,558 | B2 | 8/2006 | Berstis |
| 7,127,487 | B1 | 10/2006 | Wang |

(Continued)

FOREIGN PATENT DOCUMENTS

WO    WO-2008036128 A1 *  3/2008  ......... H04L 12/1818

OTHER PUBLICATIONS

Cisco WebEx Meetings TSP Bridge API Guide, Apr. 12, 2016, pp. 1-11.

(Continued)

*Primary Examiner* — Frantz B Jean

(57) ABSTRACT

Apparatus comprising an interface for receiving a respective uplink data stream from each of three or more further apparatuses, and for transmitting a respective downlink data stream to each of the further apparatuses; and a logic system in communication with the interface. The logic system is configured: to receive first data in the uplink data stream received from a first one of the further apparatuses; and in a first mode, to include at least some of the first data in the respective downlink data streams transmitted to every other one of the further apparatuses, or, in a second mode, to include at least some of the first data in the downlink data stream transmitted to a second one of the further apparatuses and to omit or attenuate substantially all of the first data in the downlink data stream transmitted to at least a third one of the further apparatuses. Corresponding methods and computer readable media are disclosed.

20 Claims, 5 Drawing Sheets

(56) References Cited

U.S. PATENT DOCUMENTS

| | | | |
|---|---|---|---|
| 8,144,633 B2 | 3/2012 | Yoakum | |
| 8,547,880 B2 | 10/2013 | Yoakum | |
| 9,081,485 B1 | 7/2015 | Brown | |
| 9,131,057 B2 | 9/2015 | Boss | |
| 2006/0164507 A1* | 7/2006 | Eshkoli | H04N 7/147 348/14.09 |
| 2009/0303984 A1 | 12/2009 | Clark | |
| 2010/0215164 A1* | 8/2010 | Sandgren | H04M 3/56 379/202.01 |
| 2011/0113351 A1 | 5/2011 | Phillips | |
| 2013/0096813 A1* | 4/2013 | Geffner | G01C 21/20 701/117 |
| 2013/0268598 A1 | 10/2013 | Tipirneni | |
| 2014/0092202 A1* | 4/2014 | Bentley | H04M 3/567 348/14.08 |
| 2014/0225982 A1* | 8/2014 | Avni | H04N 7/152 348/14.09 |
| 2015/0179186 A1* | 6/2015 | Swierk | G06F 3/167 704/276 |
| 2015/0326824 A1 | 11/2015 | Midtskogen Berger | |
| 2016/0027134 A1 | 1/2016 | Alvarado | |
| 2016/0149969 A1* | 5/2016 | Farmer | G06Q 10/101 709/204 |
| 2017/0208105 A1 | 7/2017 | Katekar | |
| 2017/0351476 A1* | 12/2017 | Yoakum | G06F 3/1454 |

OTHER PUBLICATIONS

Verizon, "Instant Meeting Web Moderator User Guide" https://e-meetings.verizonbusiness.com/audioconferencing/pdf/WM_UG_b.pdf.

Cisco WebEx Meetings Tsp Bridge API Guide. https://developer.cisco.com/media/TSPBridgeAPI/implement.html#sub.

* cited by examiner

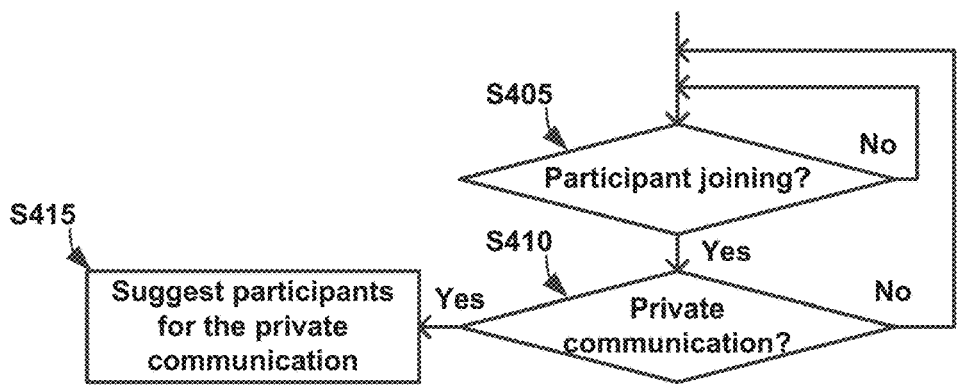

FIG. 4

```
ALGORITHM SuggestPrivateCommunication:
    Set t_join to current time;
    Search for latest disconnection time of joining participant;
    IF (no disconnection time is found) THEN
        Obtain start time of current virtual meeting;
        Set t_disconnected to the start time;
    ELSE
        Set t_disconnected to latest disconnection time;
    END IF
    Set t_absence to (t_join - t_disconnected);
    IF (t_absence > t_threshold) THEN
        Invite joining participant to a private communication;
    END IF
END.
```

FIG. 5A

```
ALGORITHM SuggestParticipants:
    Clear Participant_List;
    Set N to total number of participants;
    Set i to 1;
    WHILE (i <= N; i++) DO
        GET details of participant i;
        IF (details\opt_out = false) THEN
            IF (details\current_speaker = false) THEN
                Score participant i as a function of details;
                Include participant i in Participant_List;
            END IF
        END IF
    END WHILE
    Sort Participant_List by score in descending order;
END.
```

FIG. 5B

PRIVATE COMMUNICATIONS IN VIRTUAL MEETINGS

CROSS-REFERENCE TO RELATED APPLICATIONS

This application claims priority to U.S. Provisional Patent Application No. 62/372,979 filed on Aug. 10, 2016, which is incorporated herein by reference in its entirety.

TECHNICAL FIELD

The present document relates generally to virtual meetings, and more specifically to enabling private communications within virtual meetings.

BACKGROUND

Modern virtual-meeting systems, for example those based on Voice over Internet Protocol (VoIP) technologies, tend to allow each participant in a virtual meeting to hear every other non-muted participant in the virtual meeting. That is, when one of the participants speaks (and is not "on mute"), all of the other participants hear what he or she is saying. The other participants may also see him or her saying it, if the virtual meeting is a video-enabled virtual meeting.

U.S. Pat. No. 7,127,487 B1 discloses what is referred to therein as a "sidebar feature" for a virtual-meeting system. The sidebar feature is said to be usable to allow two or more parties within an ongoing virtual meeting to create a separate media path. In the separate media path, the respective audio streams of the two or more parties are available only to themselves, and not to the rest of the virtual-meeting participants. In this situation, the audio stream of the ongoing conference may be still audible to the two or more parties to the sidebar. Thus, the sidebar feature may be used for e.g. inter-party comments or explanations during the conference so as not to disturb the rest of the conference parties.

BRIEF DESCRIPTION OF DRAWINGS

Example embodiments will be described below with reference to the accompanying drawings, in which:

FIG. 4 is a flow diagram which shows some steps of a method performed by the apparatus shown in FIG. 3A whereby it can initiate a private communication within a virtual-meeting hosted by the virtual-meeting server;

FIG. 5A shows a pseudocode algorithm for determining whether to initiate a private communication, elaborating on step S410 shown in FIG. 4; and FIG. 5B shows a pseudocode algorithm for populating and sorting a list of suggested participants for the private communication, elaborating on step S415 shown in FIG. 4;

All the Figures are schematic and generally show only parts which are necessary in order to elucidate the present disclosure, whereas other parts may be omitted or merely suggested. Unless otherwise indicated, like reference numerals refer to like parts in different Figures.

DESCRIPTION OF EXAMPLE EMBODIMENTS

A. Overview

In broad overview, described herein are systems and methods for enabling virtual meetings in which a subset of virtual-meeting participants can hold a private communication with one another. It has been recognised that it would be an advantage if certain ones of the virtual-meeting participants could be informed automatically about the possibility of holding a private communication, and perhaps even be given suggestions with respect to other virtual-meeting participants with whom the private communication may be held. Further, it has been recognised that it would be an advantage if a virtual-meeting participant who is party to a private communication is allocated a different location, compared with the location of a virtual-meeting participant who is not party to the private communication, within a two- or three-dimensional audio scene of the virtual meeting; this would allow the listener to take advantage of the "cocktail party effect" to distinguish between a private communication and the rest of the virtual meeting. Further, it has been recognised that modern head-tracking and/or other gesture-control technology can be used conveniently to enable a participant in a virtual meeting to indicate when a private communication is desired, and perhaps even with whom the private communication is desired. These and other advantages will be appreciated from the following description of example embodiments.

B. Example Embodiments

I. Virtual Meeting System

Figure 1:
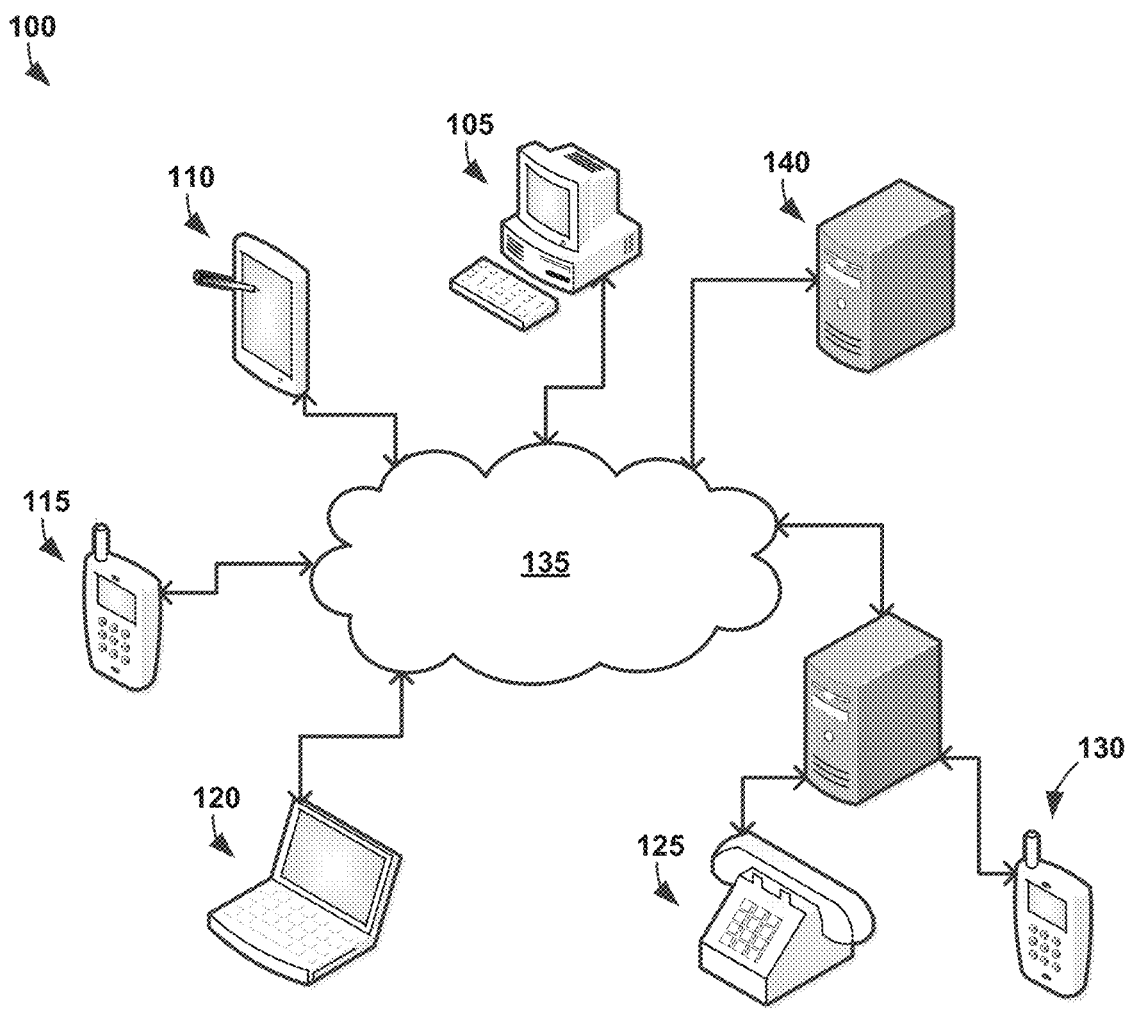
FIG. 1 shows a virtual-meeting system in accordance with an embodiment of the present disclosure.

As shown in FIG. 1, a virtual-meeting system 100 according to the present embodiment comprises a plurality of virtual-meeting endpoints 105, 110, 115, 120, 125, 130 connected to each other via a network 135. The virtual-meeting system 100 further comprises a virtual-meeting server 140 connected to the virtual-meeting endpoints 105, 110, 115, 120, 125, 130 via the network 135.

The plurality of virtual-meeting endpoints 105, 110, 115, 120, 125, 130 comprises special-purpose computing devices 105, 110, 115, 120 configured to implement techniques described herein, as well as, optionally, a conventional telephone 125 and a conventional mobile telephone 130. Example virtual-meeting endpoints based on special-purpose computing devices include desktop personal computers, laptop personal computers, tablet computers, smart phones, conference phones and the like. Other suitable virtual-meeting endpoints, which fall within the scope of the accompanying claims, will be readily appreciated by those skilled in the art.

The network 135 is an Internet Protocol (IP) based network, typically comprising the Internet. Thus communications between the virtual-meeting endpoints 105, 110, 115, 120, 125, 130 comprise IP based communications, using VoIP technologies. Telephone endpoints such as the conventional telephone 125 and the conventional mobile telephone 130 may connect to the network 135 via conventional connections, such as a plain old telephone service (POTS) connection, an Integrated Services Digital Network (ISDN) connection, a cellular network collection, or the like, in a conventional manner (well known in VoIP communications).

In the virtual-meeting system 100, the virtual-meeting endpoints 105, 110, 115, 120 comprise respective virtual-meeting applications whereby they can participate in virtual meetings hosted by the virtual-meeting server 140.

In various practical implementations, the virtual-meeting application may be available as, for example, an application suitable for desktop operating systems, an application suitable for mobile operating systems, a web browser plug-in or a native library. Typically, it manages applicable network protocols in order to be able to communicate with the virtual-meeting server 140, as well as managing any audio and/or video hardware integrated into or connected to the virtual-meeting endpoint in order to render audio and/or video data received in connection with a virtual meeting. The virtual-meeting application comprises a re-join module. The re-join module enables the virtual-meeting application to re-join a virtual meeting hosted by the virtual-meeting server 140.

The virtual-meeting server 140 comprises a virtual-meeting manager which is configured to cooperate with the virtual-meeting applications of the virtual-meeting endpoints 105, 110, 115, 120.

By way of broad overview, the virtual-meeting server 140 (specifically, in the present embodiment, the virtual-meeting manager) is configured to receive respective uplink data streams from the telephone endpoints which are joined to a current virtual meeting, and to generate therefrom a respective downlink data stream for each of said telephone endpoints. Thus, typically, each telephone endpoint's downlink data stream includes audio data from the respective uplink data streams of every other telephone endpoint (but not from its own uplink stream). Accordingly, a participant in a virtual meeting can hear, when his own downlink data stream is rendered, the respective voices of all other participants (but not his own voice).

More specifically, in some practical implementations, the virtual-meeting manager may be responsible for providing a northbound interface to a service provider application server, and may implement Media Server Mark-up Language (MSML)/Session Initiation Protocol (SIP) protocols and manage the life-cycle of its virtual meetings. It may also be responsible for the "mechanics" of controlling virtual meetings in real time, e.g. controlling the joining and leaving of participants, the respective spatial locations of participants if the virtual meeting is to be spatially rendered, and the like.

II. Example Implementation Architecture

In various embodiments, the techniques described herein are implemented by one or more apparatuses, such as one or more special-purpose computing devices. In at least one embodiment, one or more such special-purpose computing devices may be connected together and/or to other computing devices.

Figure 2:
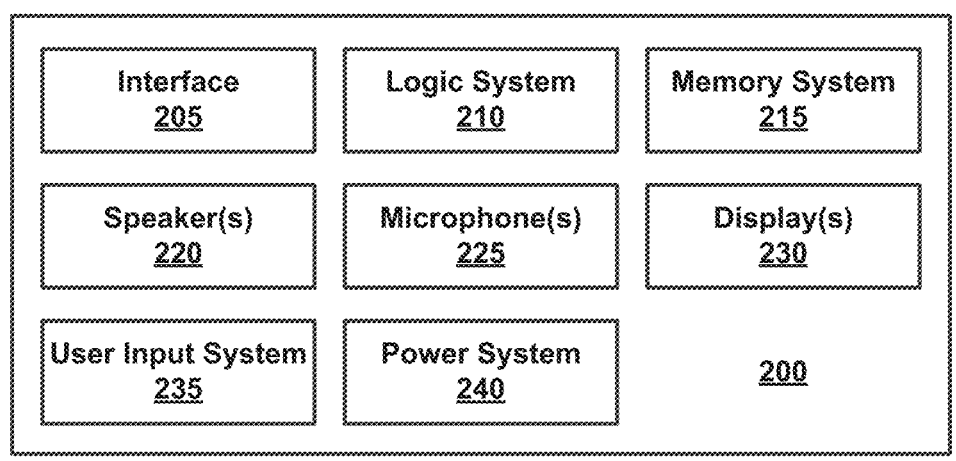
FIG. 2 is a block diagram of an apparatus suitable for implementing components of the virtual-meeting system shown in FIG. 1.

FIG. 2 is a block diagram that shows examples of components of such a special-purpose computing device 200. In this example, the computing device 200 includes an interface system 205. The interface system 205 may include a network interface, such as a wireless network interface. Alternatively, or additionally, the interface system 205 may include a universal serial bus (USB) interface or another such interface.

The device 200 includes a logic system 210. The logic system 210 may include a processor, such as a general purpose single- or multi-chip processor. The logic system 210 may include a digital signal processor (DSP), an application specific integrated circuit (ASIC), a field programmable gate array (FPGA) or other programmable logic device, discrete gate or transistor logic, or discrete hardware components, or combinations thereof. The logic system 210 may be configured to control the other components of the device 200. Although no interfaces between the components of the device 200 are shown in FIG. 2, the logic system 210 may be configured with interfaces for communication with the other components. The other components may or may not be configured for communication with one another, as appropriate.

The logic system 210 may be configured to perform data processing functionality, including but not limited to the techniques described herein. In some such implementations, the logic system 210 may be configured to operate (at least in part) according to software, such as a computer program, stored one or more non-transitory media. The non-transitory media may include memory associated with the logic system 210, such as random access memory (RAM) and/or read-only memory (ROM). The non-transitory media may include memory of a memory system 215. The memory system 215 may include one or more suitable types of non-transitory storage media, such as flash memory, a hard drive, etc.

The display system 230 may include one or more suitable types of display, depending on the manifestation of the computing device 200. For example, the display system 230 may include a liquid crystal display, a plasma display, a bistable display, etc.

The user input system 235 may include one or more devices configured to accept input from a user. In some implementations, the user input system 235 may include a touch screen that overlays a display of the display system 230. The user input system 235 may include a mouse, a track ball, a gesture detection system, a joystick, one or more GUIs and/or menus presented on the display system 230, buttons, a keyboard, switches, etc. In some implementations, the user input system 235 may include the microphone 225: a user may provide voice commands for the device 200 via the microphone 225. The logic system may be configured for speech recognition and for controlling at least some operations of the device 200 according to such voice commands.

The power system 240 may include one or more suitable energy storage devices, such as a nickel-cadmium battery or a lithium-ion battery. The power system 240 may be configured to receive power from an electrical outlet.

III. Virtual Meeting Server

Figure 3A:
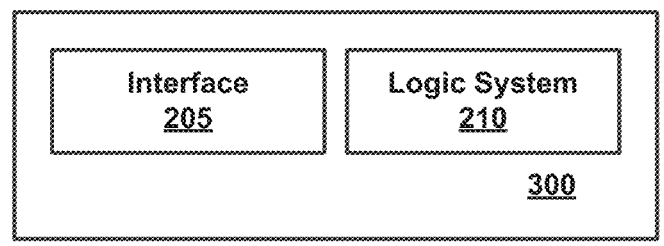
FIG. 3A shows an apparatus configured to act as a virtual-meeting server in the virtual-meeting system shown in FIG. 1.

As shown in FIG. 3A, an apparatus 300, embodying the virtual-meeting server 140, comprises an interface 205 and a logic system 210. The interface 205 is configured to receive a respective uplink data stream from each of three or more further apparatuses, such as any three of the virtual-meeting endpoints 105, 110, 115, 120, and for transmitting a respective downlink data stream to each of the further apparatuses. The logic system 210 is in communication with the interface 205.

Figure 3B:
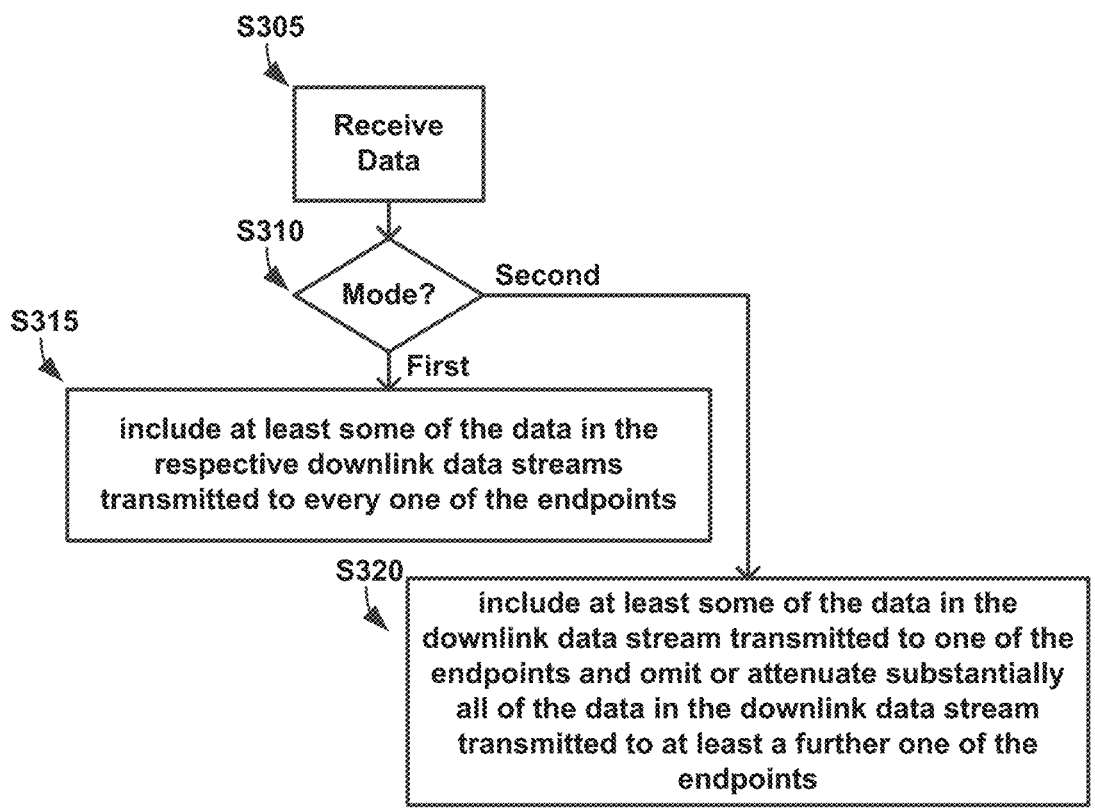
FIG. 3B is a flow diagram which shows some main steps of a method performed by the apparatus shown in FIG. 3A.

As shown in FIG. 3B, the logic system 210 of the apparatus 300 is configured to receive, at step S305, first data in the uplink data stream received from a first one of the further apparatuses, e.g. the virtual-meeting endpoint 105. The first data may comprise, for example, any one or more of audio data comprising speech and/or other sound captured by the first one of the further apparatuses; video data comprising images captured by the first one of the further apparatuses; program files; screen-sharing data; or the like.

Hereinbelow, for convenience, instead of referring to the first one of the further apparatuses, the description will refer simply to the virtual-meeting endpoint 105.

At step S310, the logic system 210 of the apparatus 300 is configured to determine whether to proceed according to a first mode or a second mode. As will be described below, this determination may be made based on a user request (e.g., a user requests that the apparatus 300 proceed according to the second mode) or based on a decision made by the apparatus 300 of its own volition.

In the first mode first mode, at step S315, the logic system 210 of the apparatus 300 includes at least some of the first data in the respective downlink data streams transmitted to every other one of the further apparatuses, e.g. the virtual-meeting endpoints 110, 115, 120.

In the second mode, at step S320, the logic system 210 of the apparatus 300 includes at least some of the first data in the downlink data stream transmitted to at least a second one of the further apparatuses, e.g. the virtual-meeting endpoint 110. The logic system 210, in the second mode, omits or attenuates (e.g., by applying a gain of less than 1, which typically is not more than 0.5, and preferably is not more than 0.1) substantially all of the first data in the downlink data stream transmitted to at least a third one of the further apparatuses, e.g. the virtual-meeting endpoints 115, 120; for example, in the present embodiment none of the audio data received from the virtual-meeting endpoint 105 will be transmitted to the virtual-meeting endpoints 115, 120.

Hereinbelow, for convenience, instead of referring to the second one of the further apparatuses, the description will refer to the virtual-meeting endpoint 110, and instead of referring to at least a third one of the further apparatuses, the description will refer to the virtual-meeting endpoints 115, 120.

It will be appreciated that if the apparatus 300 is operating in the first mode then each participant in a virtual meeting can hear speech from any other participant in the virtual meeting; in the present example, that means participants using the virtual-meeting endpoints 110, 115, 120 can hear speech from the participant(s) using the virtual-meeting endpoint 105. In contrast, if the apparatus 300 is operating in the second mode then a certain one (or more) of the participants can be heard by only a subset of the other participants; in the present example, that means only the participant(s) using the virtual-meeting endpoint 110 can hear speech from the participant(s) using the virtual-meeting endpoint 105. Thus the second mode can enable private communication, within a virtual meeting, between a subset of participants of the virtual meeting; the private communication may, for example, be unidirectional, from one of the virtual-meeting endpoints to one or more other virtual-meeting endpoints.

The logic system 210 of the apparatus 300, in the second mode, receives second data in the uplink data stream received from the virtual-meeting endpoint 110. The second data may comprise, for example, any one or more of audio data comprising speech and/or other sound captured by the virtual-meeting endpoint 110; video data comprising images captured by the virtual-meeting endpoint 110; program files; screen-sharing data; or the like.

The logic system 210 of the apparatus 300, in the second mode, includes at least some of the second data in the downlink data stream transmitted to the virtual-meeting endpoint 105. The logic system 210 omits or attenuates substantially all of the second data from the downlink data stream transmitted to the virtual-meeting endpoints 115, 120; for example, in the present embodiment none of the audio data received from the virtual-meeting endpoint 110 will be transmitted to the virtual-meeting endpoints 115, 120. It will be appreciated, therefore, that the aforementioned private communication (enabled by the second mode) may, for example, be bidirectional between any two or more of the virtual-meeting endpoints.

It will be appreciated that the aforementioned private communication enabled by the second mode may involve three or more virtual-meeting endpoints, in which case each of them would receive audio and/or video data from any other of them; this is simply a matter of selecting, from the participants in a virtual meeting, a subset of participants who are to be party to the private communication.

The logic system 210 of the apparatus 300, in the second mode, receives third data in the uplink data stream received from the virtual-meeting endpoint 120. The third data may comprise, for example, any one or more of audio data comprising speech and/or other sound captured by the virtual-meeting endpoint 120; video data comprising images captured by the virtual-meeting endpoint 120; program files; screen-sharing data; or the like.

The logic system 210, in the second mode, includes at least some of the third data in the respective downlink data streams transmitted to the virtual-meeting endpoints 105, 110, 115. It will therefore be appreciated that, in the second mode, virtual-meeting endpoints which are party to the private communication (enabled by the second mode) are also able to receive audio data and/or video data from virtual-meeting endpoints which are not party to the private communication. For example, in a meeting comprising, say, ten participants, where one of the participants is giving a presentation, the apparatus 300, in the second mode, enables another two of the participants to have a private discussion while still being able to hear (and perhaps see) the presenter give his or her presentation.

Referring to the determination at step 310, described above, the first mode may be the default mode. Then, transitioning from the first mode to the second mode is done in response to a user request or by the apparatus 300 of its own volition.

The user request may be received from any one or more of the virtual-meeting endpoints 105, 110, 115, 120. For example, in order to facilitate a conversation between the virtual-meeting endpoint 105 and the virtual-meeting endpoint 110, the user request may comprise at least one of: control information received from the virtual-meeting endpoint 105; or control information received from the virtual-meeting endpoint 110. In which case, the control information received from the virtual-meeting endpoint 105 may identify (at least) the virtual-meeting endpoint 110; likewise, the control information received from the virtual-meeting endpoint 110 may identify (at least) the virtual-meeting endpoint 105.

IV. Server-Initiated Private Communication

The following description assumes that, to begin with, at least the virtual-meeting endpoints 110, 115, 120 are joined to a virtual meeting hosted by virtual-meeting server 140, embodied in the apparatus 300 operating in the first mode. The following description concerns the transition from the first mode to the second mode in response to a decision by the apparatus 300 of its own volition.

It is noted that the logic system 210 is configured to determine and then store to memory the respective times at which the further apparatuses joined the virtual meeting (e.g., as an independent indication, such as 4.15 PM (GMT), and/or as a relative indication, such as 601.24 seconds after a start time of the virtual meeting). The logic system 210 is further configured to determine and store to memory the start time of the virtual meeting; for example, the start time could be the time at which the virtual meeting was scheduled to start, the time at which an earliest-joining one of the further apparatuses joined the virtual meeting or the time at which a second-to-join one of the further apparatuses joined the virtual meeting.

Referring to FIG. 4, the apparatus 300 is responsive to a new virtual-meeting endpoint joining a current virtual meeting. At step S405, the logic system 210 of the apparatus 300 determines that the virtual-meeting endpoint 105 is joining the virtual meeting and, in response, proceeds to step S410.

At step S410, the logic system 210 of the apparatus 300 determines that the virtual-meeting endpoint 105 is joining the virtual meeting after a period of absence whose duration exceeds a threshold (for example, threshold may be set at 60 seconds; no specific value of the threshold is essential; e.g., it may be adjusted in accordance with user preference), and therefore that the virtual-meeting endpoint 105 should be invited to hold a private communication with the (respective) user(s) of at least one of the already-joined the virtual-meeting endpoints 110, 115, 120. FIG. 5A shows a pseudo-code algorithm, labelled SuggestPrivateCommunication, suitable for making said determination.

According to the SuggestPrivateCommunication algorithm, if the virtual-meeting endpoint 105 is joining the virtual meeting for the first time, then the logic system 210 retrieves from memory the start time of the virtual meeting, determines at what time the virtual-meeting endpoint 105 joined the virtual meeting and then compares the start time with the join time to determine the duration of the period of absence.

It is noted that the logic system 210 is configured to determine and then store to memory, in response to one of the further apparatuses disconnecting from the virtual meeting, the time at which said one of the further apparatuses disconnected (e.g., as an independent indication, such as 4.15 PM (GMT), or as a relative indication, such as 601.24 seconds after the start time of the virtual meeting).

The foregoing description discusses the joining and disconnecting from a virtual meeting by apparatuses, which in some embodiments is what the logic system 210 may log and take account of. In some embodiments, the joining and disconnecting from a virtual meeting by participants is relevant instead or as well, in which embodiments the logic system 210 as access to respective identifiers of the participants. For example, a participant may have joined a virtual meeting using a teleconferencing apparatus installed in a meeting room, and then subsequently may have left the meeting room and re-joined the virtual meeting using e.g. his or her mobile phone: in this scenario, the logic system 210 may log and take account of the join time and the re-join time of the participant as well as or instead of the respective join times of the teleconferencing apparatus and the mobile phone.

According to the SuggestPrivateCommunication algorithm, if the virtual-meeting endpoint 105 is re-joining the virtual meeting (having previously disconnected therefrom), then the logic system 210 retrieves from memory the (most recent) disconnection time of the virtual-meeting endpoint 105, determines at what time the virtual-meeting endpoint 105 re-joined the virtual meeting and then compares the disconnection time with the re-join time to determine the duration of the period of absence.

The logic system 210 of apparatus 300 is further configured to select, at least provisionally, one or more of the virtual-meeting endpoints 110, 115, 120 to receive, in the second mode, said at least some of the first data. In this embodiment, the logic system 210 is configured to select, at least provisionally, the one of the virtual-meeting endpoints 110, 115, 120 which lies at the top of a sorted list of the virtual-meeting endpoints 110, 115, 120, which list may comprise all of the virtual endpoints (except, of course, the virtual-meeting endpoint 105) or a subset of them.

Referring to FIG. 4, the logic system 210 of apparatus 300, as a result of determining at step S410 that a private communication should be suggested, proceeds at step S415 to generate (or refresh) the sorted list of the further apparatuses; a pseudocode algorithm suitable for this, labelled SuggestParticipants, is shown in FIG. 5B.

According to the SuggestParticipants algorithm, the logic system 210 of apparatus 300 obtains details of each of the participants and uses the details to determine which of the participants should be added to the list and which should not. The obtained details include: respective connection-quality indicators of the further apparatuses, indicating the quality levels of the further apparatuses' respective connections to the virtual meeting; bandwidth indicators of the further apparatuses, indicating the bandwidth of the further apparatuses respective connections to the virtual meeting; respective participant-number indicators of the further apparatuses, indicating the respective numbers of virtual-meeting participants associated with the further apparatuses (e.g., if one of the further apparatuses is embodied in a meeting-room conferencing system then there may, sometimes, be upwards of a dozen participants (i.e., all of the occupants of the meeting room) associated with that one of the further apparatuses).

To obtain connection-quality indicators for a participant, the server may periodically receive telemetry data from the client detailing network characteristics such as the frequency and duration of bursts of packet loss and total roundtrip latency. This telemetry data may also contain aggregate statistics about the contents of the information being sent to the server, such as the amount of perceived echo, the characteristics of the audio device (e.g. give preference to devices with low audio pull jitter, give preference to headsets over speaker phones), and video quality metrics (e.g. give preference to video containing faces, or with high signal-to-noise ratio).

According to the SuggestParticipants algorithm, the logic system 210 of apparatus 300 omits from the list any of the further apparatuses whose details show that its uplink data stream includes substantially no voice activity. Typically, a participant who is currently speaking is not a participant with whom one would want to have a private communication "on the side". Similarly, the logic system 210 of apparatus 300 omits from the list any of the further apparatuses whose details show that the value of its manual-opt-out flag has been set to true. Some participants in a virtual meeting may know in advance that they do not want to be disturbed by private communication some other participants, and so can block private communications by setting the value of the manual-opt-out flag to true.

According to the SuggestParticipants algorithm, the logic system 210 of apparatus 300 gives each of the participants a score, the score being a function of the obtained details of the respective participant. According to the function, with all other considerations being equal, one of the further apparatuses which was joined to the virtual meeting during at least a portion of the period of absence will appear higher in the list than one of the further apparatuses which was joined to the virtual meeting for less (or none) of the period of absence, and those ones of the further apparatuses which joined the virtual meeting at or near the start time (the respective (latest) join times lie within a predetermined interval containing the start time of the virtual meeting) will appear at the top end of the list. According to the function, with all other considerations being equal, the one of the further apparatuses which has the highest connection-quality indicator will appear highest in the list, and those ones of the further apparatuses which have a connection-quality indicator that exceeds a predetermined quality threshold will appear at the top end of the list. According to the function, with all other considerations being equal, the one of the further apparatuses which has the highest bandwidth indicator will appear highest in the list, and those ones of the further apparatuses which have a bandwidth indicator that exceeds a predetermined quality threshold will appear at the top end of the list. According to the function, with all other considerations being equal, the ones of the further apparatuses which have participant-number indicators that are below a predetermined participant-number threshold (preferably, the participant-number threshold is set at 2) will appear at the top end of the list. Another input to the score function may be the participant's position in the company organisation hierarchy, if such information is available, with preference given to those lower in the organisation chart who are perhaps less integral to the main conversation.

The logic system 210 includes said at least some of the first data in the respective downlink data stream, or streams, of the selected one or more of the further apparatuses if, and only if, doing so is approved by the first one of the further apparatuses. In the present embodiment, the logic system 210 is configured to identify, to the first one of the further apparatuses, the selected one or more of the further apparatuses. The first one of the further apparatuses is configured to, in response, inform the user thereof that she may enter into a private communication with the user(s) of the selected one or more of the further apparatuses, which she may accept or decline. If she accepts, the first one of the further apparatuses sends the approval to the apparatus 300.

The logic system 210 is configured to include said at least some of the first data in the respective downlink data stream, or streams, of the selected one or more of the further apparatuses if, and only if, doing so is approved by the selected one or more of the further apparatuses. In the present embodiment, the logic system 210 is configured to notify the selected one or more of the further apparatuses of the option to receive said at least some of the first data. Each of the selected one or more of the further apparatuses is configured to, in response, inform the user thereof that she may enter a private communication with the user(s) of the first one of the further apparatuses, which she may accept or decline. If she accepts, the corresponding one of the further apparatuses sends its approval to the apparatus 300.

V. Rendering Virtual-Meeting Audio Data

Preferably, the virtual-meeting endpoint is capable of presenting to the user a two- or three-dimensional audio scene representative of the virtual meeting. For example, one embodiment of the virtual-meeting endpoint (discussed below, in section VI) is configured to present the two- or three-dimensional audio scene via a connected headphone, using conventional binaural techniques.

The logic system 210 is configured to include spatial information in the downlink data stream transmitted, in the second mode, to the virtual-meeting endpoint 110. The spatial information specifies a desired location of the virtual-meeting endpoint 105 in the two- or three-dimensional audio scene. The spatial information also specifies a desired location of the virtual-meeting endpoint 120 in the rendered two- or three-dimensional audio scene, the desired location of the virtual-meeting endpoint 120 being different from the desired location of the virtual-meeting endpoint 105. The spatial information may be "prebaked" into the data in the downlink data stream; for example, said data may comprise a pair of binaural audio signals suitable for driving the aforementioned connected headphone, whereby in the resulting rendered audio scene the virtual-meeting endpoint 105 and the virtual-meeting endpoint 120 are located in their respective desired locations. Alternatively, sound from each one of the virtual-meeting endpoints may be represented by its own audio object or stem, and in the spatial information may be represented in respective metadata accompanying the audio objects or stems. No particular manner of rendering or transmitting specialised audio data is essential.

Figure 6A:
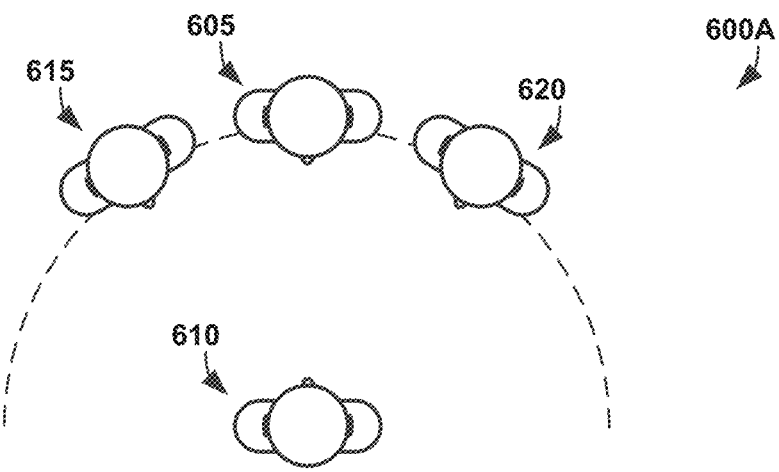
FIG. 6A-6C show respective two-dimensional audio scenes of a virtual meeting created by the apparatus shown in FIG. 3A.

As shown in FIG. 6A, the audio scene may comprise a two-dimensional audio scene 600A in which a respective unique location is allocated to each one of the further apparatuses (provided that the total number of further apparatuses does not exceed a threshold). Therefore, for example, the two-dimensional audio scene 600A heard by the user of the virtual-meeting endpoint 110 will include respective different locations 605, 615, 620 (relative to a listening location 610) for sound captured at the virtual-meeting endpoints 105, 115, 120.

Figure 6B:
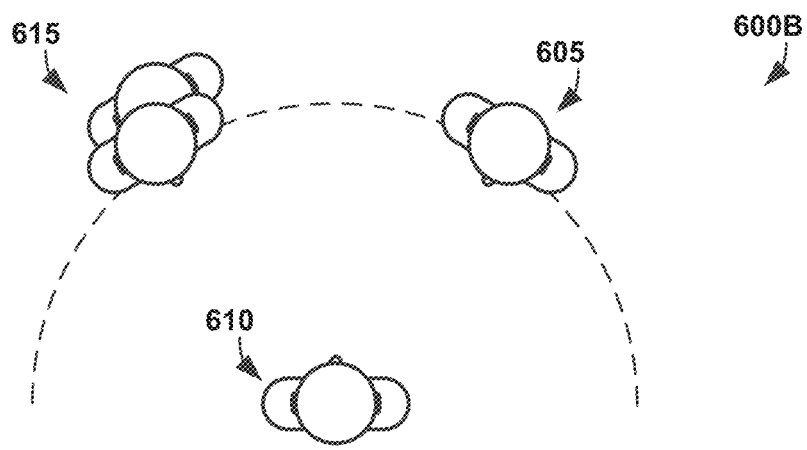

As shown in FIG. 6B, the audio scene may comprise a two-dimensional audio scene 600B in which one location 605 is allocated to any of the further apparatuses which is party to a private communication, and a different location 615 is allocated to any of the further apparatuses which is/are not party to the private communication. Therefore, for example, the two-dimensional audio scene 600B heard by the user of the virtual-meeting endpoint 110 will include one location 605 (relative to a listening location 610) for sound captured at the virtual-meeting endpoint 105, and a different location 615 (relative to a listening location 610) for sound captured at any of the virtual meeting endpoints 115, 120.

Figure 6C:
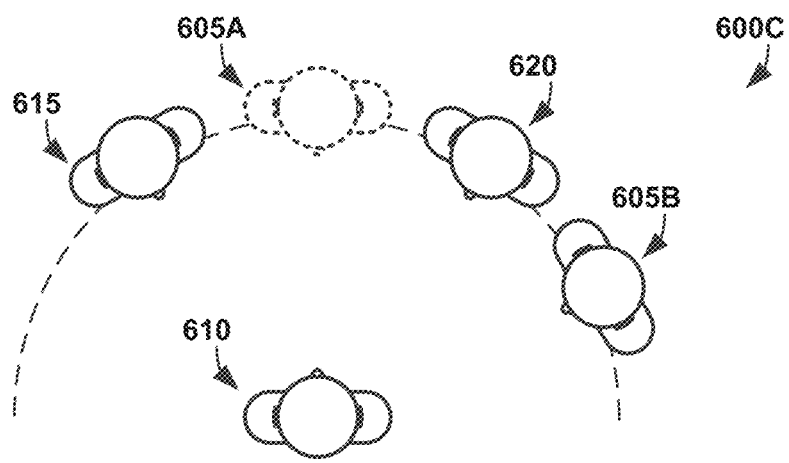

As shown in FIG. 6C, the audio scene may comprise a two-dimensional audio scene 600C in which the allocation of location depends on whether or not a given one of the further apparatuses is party to a private communication. Therefore, for example, the two-dimensional audio scene 600C heard by the user of the virtual-meeting endpoint 110 will include one location 605A (relative to a listening location 610) for sound captured at the virtual-meeting endpoint 105 when the virtual-meeting endpoint 105 is party to a private communication, and a different location 605B (relative to a listening location 610) for sound captured at the virtual-meeting endpoint 105 when the virtual-meeting endpoint 105 is not party to the private communication. For example, at least two unique locations (one for participating in a private communication, the other for participating in the "full" virtual meeting) may be allocated to each one of the further apparatuses (provided that the total number of further apparatuses does not exceed a threshold).

VI. Virtual-Meeting Endpoint

Figure 7A:
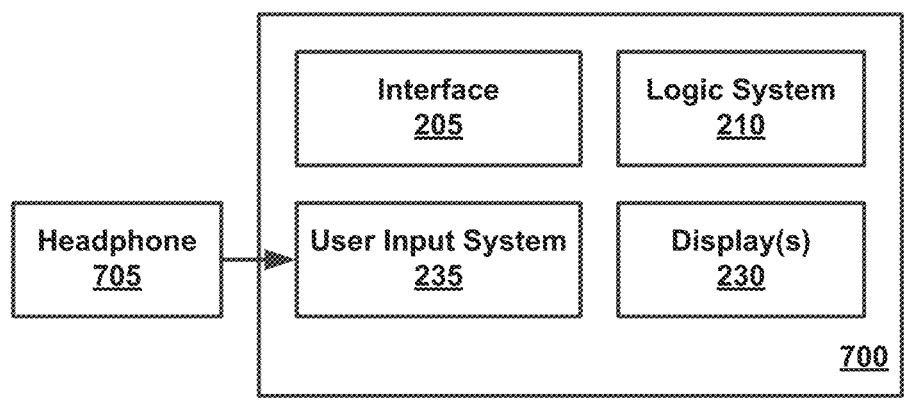
FIG. 7A shows an apparatus configured to act as a virtual-meeting endpoint in the virtual-meeting system shown in FIG. 1.

Referring to FIG. 7A, an apparatus 700 configured to embody one of the virtual-meeting endpoints comprises an interface 205 configured to transmit an uplink data stream to the virtual-meeting server 140, and to receive a downlink data stream from the virtual-meeting server 140. The apparatus 700 further comprises a user input system 235 configured to receive one or more inputs from a user. The apparatus 700 further comprises a logic system 210 in communication with the interface and the user input system.

Figure 7B:
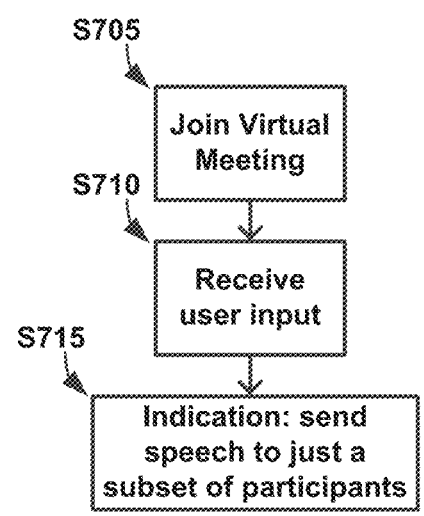
FIG. 7B is a flow diagram which shows some main steps of a method performed by the apparatus shown in FIG. 7A.

As shown in FIG. 7B, the logic system joins, at step S705 of a method performed by the apparatus 700, a virtual meeting hosted by the virtual-meeting server 140.

The logic system 210 receives, at step S710 of the method, a first input from the user.

At step S715 of the method, the logic system 210 indicates to the virtual-meeting server 140, in response to receiving the first input from the user, and when two or more further apparatuses are joined to the virtual meeting, that at least some of the data in the uplink data stream is to be sent to just a subset of the further apparatuses. The first input from the user identifies the subset of the further apparatuses.

As noted above, a private communication can be server-initiated. In that case, the first input typically comprises an acceptance of an invitation to enter into a private communication with the user(s) of the subset of the further apparatuses; as such, the first input from the user identifies the subset of the further apparatuses by being responsive to an invitation which identifies the subset of the further apparatuses.

In addition to accepting or declining an invitation to join a server-initiated private communication, the apparatus 700 is also configured to enable the user to initiate a private communication. In that case, the first input comprises a user request to enter into a private communication, and indicates the (user-selected) subset of the further apparatuses.

VII. User Interface

In the present embodiment, the apparatus 700 is connected to a head-tracking headphone 705 (which in the present embodiment is part of the user input system 235), and the first input from the user is received from the head-tracking headphone 705. As well as generating an audio signal representative of the speech of the user, and rendering into sound an audio signal representative of far end speech, the head-tracking headphone 705 is also configured to generate information indicative of the current direction in which the user is facing. The aforementioned first input from the user, from the head-tracking headphone 705, is indicative of the user facing, or turning to face, in a first direction.

The logic system 710 is configured to render, via the head-tracking headphone 705, a two- or three-dimensional audio scene representative of sounds connected with the virtual meeting (e.g., as described above in section V), such as speech of participants in the virtual meeting, using spatial information as noted above.

In the audio scene, at least one virtual location is allocated to the subset of the further apparatuses. The first direction corresponds to said at least one virtual location. Thus, the user can indicate that she would like to enter into (or remain in) a private communication by facing a virtual location of a participant in the private communication. It will be appreciated that the head-tracking feature of the headphone 705 is optional; other embodiments may use other suitable means by which the user can indicate that she would like to enter into (or remain in) a private communication.

The apparatus 700 comprises an output device 230 for presenting information to the user. The logic system 210 is further configured to present to the user, via the output device 230, information about one or more of the further apparatuses. In the present embodiment, the output device 230 comprises a visual display unit and the logic system 210 is configured to display to the user, via the visual display unit, the information about the one or more further apparatuses. For example, the information about the one or more further apparatuses may identify the one or more further apparatuses and/or identify a user, or respective users, associated with the one or more other apparatuses. The information about the one or more further apparatuses may, for example, comprise an indication, or respective indications, of how long the one or more further apparatuses has, or have, been joined to the virtual meeting. Consequently, the user would be able to, for example, initiate a private communication with a participant who is known to the user and who has been participating in the virtual meeting since it began.

C. Equivalents, Alternatives & Miscellaneous

Further embodiments of the present disclosure will become apparent to a person skilled in the art after studying the description above.

As noted above, if the apparatus 300 is operating in the second mode then a certain one (or more) of the participants can be heard by only a subset of the other participants. This does not necessarily mean that the subset of the other participants receive all of the audio data that was included in the uplink stream from the certain one (or more) of the participants. Further, the audio data received by the subset of the other participants may be a processed and therefore different version of the audio data that was included in the uplink stream from the certain one (or more) of the participants. For example, the subset of the other participants may receive no audio data related to the private conversation enabled by the second mode under certain circumstances, such as the occurrence of events in the main meeting which are deemed to be of importance (e.g., a participant joining the meeting, a previously-silent participant speaking, one or more participants speaking particularly loudly, two or more participants speaking at the same time, etc.). By way of another example, the audio data related to the private conversation enabled by the second mode may be processed by applying different amounts of reverberation, attenuating the audio signals. These variations may be determined based on server-side settings, participant-side settings, or a combination of these.

If the apparatus 300 is operating in the second mode then substantially all of the audio data received from a certain one (or more) of the participants is omitted or attenuated in the downlink data stream transmitted to at least one of the other participants. Therefore, said at least one of the other participants may hear nothing of the private conversation enabled by the second mode, may hear a quieter version of the private conversation enabled by the second mode (e.g., bearing some similarities to being able to hear one participant whispering to another participants during an in-person meeting), or may hear an audible indication that such a private conversation is underway (for example, the audible indication may be responsive to the presence or absence of a voice activity detection (VAD) flag rather than being based on speech of participants).

There are various suitable ways of determining respective connection-quality indicators of the further apparatuses. For example, by one or more of: assessing packet loss rate and/or burstiness factor; detecting artefacts caused by dual tone multifrequency (DTMF) removal processing; taking account of the codec requested during the respective handshakes as participants join a virtual meeting; taking account of the use (or not) of video hardware; taking account of whether a hardwired (e.g., Ethernet) or wireless (e.g., via cellular network, such as a 4G network); or the like.

There are various suitable ways of determining respective (audio) bandwidth indicators of the further apparatuses. For example, by one or more of: analysing the content of the speech or other audio signals to determine the highest frequency component in the audio data; analysing metadata and/or handshake data which indicates the sample rate of the audio data; or the like.

There are various suitable ways of determining respective participant-number indicators of the further apparatuses. For example, by one or more of: the further apparatuses being configured to have participants enter their names; by using voice analysis techniques (such as talker diarization) to determine how many people are around the phone; or the like.

Even though the present description and drawings disclose embodiments and examples, the disclosure is not restricted to these specific examples. Numerous modifications and variations can be made without departing from the scope of the present disclosure, which is defined by the accompanying claims.

Any reference signs appearing in the claims are not to be understood as limiting their scope.

Additionally, variations to the disclosed embodiments can be understood and effected by the skilled person in practicing the disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. An apparatus comprising:
an interface configured to receive a respective uplink data stream from each of three or more further apparatuses in a virtual meeting, and to transmit a respective downlink data stream to each of the further apparatuses in the virtual meeting;
wherein the three or more further apparatuses are separate from the apparatus and communicate with the apparatus over a network; and
a logic system in communication with the interface, the logic system being configured:
to generate, in response to receiving, by the apparatus, a request from a first one of the further apparatuses to join the virtual meeting after the virtual meeting has already started, a list of candidate participants for private communication, wherein the list of candidate participants includes one or more of the further apparatuses in the virtual meeting, wherein the list of candidate participants excludes an actively speaking one of the further apparatuses;
to receive, by the apparatus from the first one of the further apparatuses, a selection of a second one of the further apparatuses for the private communication from the list of candidate participants;
wherein the selection of the second one of the further apparatuses is made by a user operating the first one of the further apparatuses;
to receive first data in the uplink data stream received by the apparatus from the first one of the further apparatuses; and
in a first mode, to include at least some of the first data in the respective downlink data streams transmitted to every other one of the further apparatuses, or, in a second mode, to include at least some of the first data in the downlink data stream transmitted to the second one of the further apparatuses and to omit or attenuate substantially all of the first data in the downlink data stream transmitted to at least a third one of the further apparatuses.

2. The apparatus of claim 1,
wherein at least the second and third ones of the further apparatuses are joined to a virtual meeting hosted by the apparatus,
wherein the logic system is further configured to determine that the first one of the further apparatuses is joining the virtual meeting after a period of absence whose duration exceeds a threshold, and
wherein the logic system is further configured to transition into the second mode in response to the determination.

3. The apparatus of claim 1 wherein the logic system is further configured to select, at least provisionally, one or more of the further apparatuses to receive, in the second mode, said at least some of the first data, wherein said selecting is based on one or more system-related parameters and/or one or more meeting-related parameters.

4. The apparatus of claim 3 wherein said selecting comprises:
determining respective connection-quality indicators of the further apparatuses, the connection-quality indicators being indicative of the quality levels of the further apparatuses' respective connections to the virtual meeting, which is the, or one of the, system-related parameters; and
selecting, at least provisionally, from the further apparatuses, an apparatus having a connection-quality indicator that exceeds a predetermined quality threshold.

5. The apparatus of claim 3 wherein said selecting comprises:
determining respective bandwidth indicators of the further apparatuses, the bandwidth indicators being indicative of the bandwidth of the further apparatuses' respective connections to the virtual meeting, which is the, or one of the, system-related parameters; and
selecting, at least provisionally, from the further apparatuses, an apparatus having a bandwidth indicator that exceeds a predetermined bandwidth threshold.

6. The apparatus of claim 3 wherein said selecting comprises:
determining respective join times of respective participants who joined using the further apparatuses, the respective join times being indicative of when the participants joined the virtual meeting, which is the, or one of the, meeting-related parameters; and
selecting, at least provisionally, from the further apparatuses, an apparatus used by a participant whose join time lies within a predetermined interval containing a start time of the virtual meeting.

7. The apparatus of claim 3 wherein said selecting, at least provisionally, the one or more of the further apparatuses comprises:
determining respective participant-number indicators of the further apparatuses, the participant-number indicators being indicative of the respective numbers of virtual-meeting participants associated with the further apparatuses, which is the, or one of the, meeting-related parameters; and
selecting, at least provisionally, from the further apparatuses, an apparatus having a participant-number indicator that is below a predetermined participant-number threshold.

8. The apparatus of claim 3 wherein said selecting, at least provisionally, the one or more of the further apparatuses comprises selecting, at least provisionally, one of the further apparatuses whose uplink data stream includes substantially no voice activity, which is the, or one of the, meeting-related parameters.

9. The apparatus of claim 3 wherein said selecting, at least provisionally, the one or more of the further apparatuses comprises selecting, at least provisionally, one of the further apparatuses which was joined to the virtual meeting during at least a portion of the period of absence, which is the, or one of the, meeting-related parameters.

10. The apparatus of claim 1 wherein the logic system is further configured to include spatial information in the downlink data stream transmitted, in the second mode, to the second one of the further apparatuses, the spatial information specifying respective desired locations for the first and third ones of the further apparatuses in a rendered two- or three-dimensional audio scene, the respective desired locations being different, wherein the desired location for the first one of the further apparatuses is different from a first-mode location for the first one of the further apparatuses.

11. A non-transitory, computer-readable storage medium on which is stored a computer program which, when executed by a logic system of an apparatus which comprises the logic system and, in communication therewith, a transceiver for receiving a respective uplink data stream from each of three or more further apparatuses, and to transmit a respective downlink data stream to each of the further apparatuses, wherein the three or more further apparatuses are separate from the apparatus and communicate with the apparatus over a network; configures the apparatus in accordance with claim 1.

12. A method, in an apparatus configured to receive a respective uplink data stream from each of three or more further apparatuses in a virtual meeting, and to transmit a respective downlink data stream to each of the further apparatuses in the virtual meeting, wherein the three or more further apparatuses are separate from the apparatus and communicate with the apparatus over a network; the method comprising:
  generating, in response to receiving, by the apparatus, a request from a first one of the further apparatuses to join the virtual meeting after the virtual meeting has already started, a list of candidate participants for private communication, wherein the list of candidate participants includes one or more of the further apparatuses in the virtual meeting, wherein the list of candidate participants excludes an actively speaking one of the further apparatuses;
  receiving, by the apparatus from the first one of the further apparatuses, a selection of a second one of the further apparatuses for the private communication from the list of candidate participants;
  wherein the selection of the second one of the further apparatuses is made by a user operating the first one of the further apparatuses;
  receiving first data in the uplink data stream received by the apparatus from the first one of the further apparatuses; and
  in a first mode, including at least some of the first data in the respective downlink data streams transmitted to every other one of the further apparatuses, or, in a second mode, including at least some of the first data in the downlink data stream transmitted to the second one of the further apparatuses and to omit or attenuate substantially all of the first data in the downlink data stream transmitted to at least a third one of the further apparatuses.

13. An apparatus comprising:
  an interface configured to transmit an uplink data stream to a virtual-meeting server, and to receive a downlink data stream from the virtual-meeting server;
  a user input system configured to receive one or more inputs from a user; and
  a logic system in communication with the interface and the user input system, the logic system being configured:
    to send a request, from the apparatus to the virtual-meeting server, to join a virtual meeting, of two or more further apparatuses and the apparatus, hosted by the virtual-meeting server after the virtual meeting has already started;
    wherein the apparatus and the two or more further apparatuses are separate from the virtual-meeting server and communicate with the virtual-meeting server over a network;
    to receive, by the apparatus from the virtual meeting server, a list of candidate participants for private communication, wherein the list of candidate participants includes at least one of the two or more further apparatuses in the virtual meeting, wherein the list of candidate participants excludes an actively speaking one of the two or more further apparatuses;
    to send, from the apparatus to the virtual meeting server, a selection of a subset of the further apparatuses for the private communication from the list of candidate participants, wherein the subset of the further apparatuses includes a second one of the further apparatuses;
    wherein the selection of the subset of the further apparatuses is made by the user operating the apparatus;
    to receive a first input from the user; and
    to indicate to the virtual-meeting server, in response to receiving the first input from the user that at least some of the data in the uplink data stream is to be sent to just the subset of the further apparatuses;
    wherein the apparatus sends first data to the virtual-meeting server;
    to cause the virtual-meeting server to transmit, in a first mode, at least some of the first data in downlink data streams to every one of the further apparatuses, or, in a second mode, at least some of the first data in a downlink data stream to the second one in the subset of the further apparatuses while omitting or attenuating substantially all of the first data to at least a third one of the further apparatuses.

14. The apparatus of claim 13 wherein, when the apparatus is connected to a head-tracking headphone, the first input from the user is received from the head-tracking headphone and is indicative of the user facing, or turning to face, in a first direction.

15. The apparatus of claim 14 wherein the logic system is further configured to render, via two or more loudspeakers, a two- or three-dimensional audio scene representative of sounds connected with the virtual meeting, such as speech of participants in the virtual meeting, and wherein the first direction corresponds to a virtual location in the audio scene, the virtual location being associated with the subset of the further apparatuses.

16. The apparatus of claim 13 wherein the first input from the user identifies the subset of the further apparatuses.

17. The apparatus of claim 13 further comprising an output device for presenting information to the user, wherein the logic system is further configured to present to the user, via the output device, information about one or more of the further apparatuses.

18. The apparatus of claim 13 wherein the information about the one or more further apparatuses comprises an indication, or respective indications, of how long the one or more further apparatuses has, or have, been joined to the virtual meeting.

19. A non-transitory, computer-readable storage medium on which is stored a computer program which, when executed by a logic system of an apparatus which comprises the logic system and, in communication therewith, a transceiver for receiving a downlink data stream from a virtual-meeting server and transmitting an uplink data stream to the virtual-meeting server, configures the apparatus in accordance with claim 13.

20. A method performed by an apparatus configured to receive one or more inputs from a user, to receive a downlink data stream from a virtual-meeting server and to transmit an uplink data stream to the virtual-meeting server, the method comprising:
  sending a request, from the apparatus to the virtual-meeting server, to join a virtual meeting, of two or more further apparatuses and the apparatus, hosted by the virtual-meeting server after the virtual meeting has already started;
  receiving, by the apparatus from the virtual-meeting server, a list of candidate participants for private communication, wherein the list of candidate participants includes at least one of the two or more further apparatuses in the virtual meeting, wherein the list of candidate participants excludes an actively speaking one of the two or more further apparatuses;
  sending, to the virtual-meeting server, a selection of a subset of the further apparatuses for the private communication from the list of candidate participants, wherein the subset of the further apparatuses includes a second one of the further apparatuses;
  wherein the selection of the subset of the further apparatuses is made by the user operating the apparatus;
  receiving a first input from the user; and
  indicating to the virtual-meeting server, in response to receiving the first input from the user that at least some of the data in the uplink data stream is to be sent to just a subset of the further apparatuses;
  sending first data to the virtual-meeting server;
  causing the virtual-meeting server to transmit, in a first mode, at least some of the first data in downlink data streams to every one of the further apparatuses, or, in a second mode, at least some of the first data in a downlink data stream to the second one in the subset of the further apparatuses while omitting or attenuating substantially all of the first data to at least a third one of the further apparatuses.

* * * * *